Figure 1:
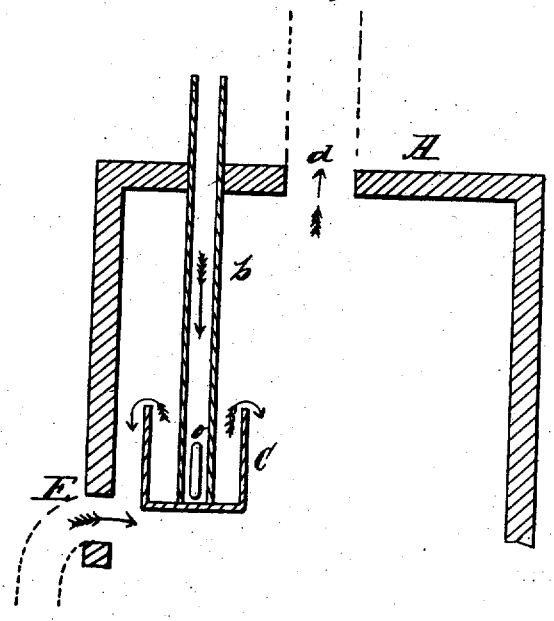

E. R. Stilwell,

Steam-Boiler Condenser.

No. 2,160. Reissued Jan. 23, 1866.

Witnesses.

Thos D Mitchell

Joseph H Shule

Inventor.

Edwin R Stilwell

UNITED STATES PATENT OFFICE.

EDWIN R. STILWELL, OF DAYTON, OHIO.

IMPROVEMENT IN FEED-WATER HEATERS AND FILTERS.

Specification forming part of Letters Patent No. 44,561, dated October 4, 1864; Reissue No. 2,160, dated January 23, 1866.

DIVISION Q.

*To all whom it may concern:*

Be it known that I, EDWIN R. STILWELL, of Dayton, in the county of Montgomery, in the State of Ohio, have invented a new and Improved Mode of Heating and Purifying Water for Steam-Boilers; and I do hereby declare that the following is a full and exact description thereof, reference being had to the accompanying drawing, and to the letters of reference marked thereon.

The nature of my invention consists in the means of supplying water to a feed-water heater and filter, and of effecting the separation of foreign elements therefrom.

To enable others skilled in the art to make and use my invention, I will proceed to describe its construction and operation.

The figure represents a vertical section of the upper part of a feed-water heater and filter.

A represents the upper part of a tight vessel, either cylindrical or rectangular in form. *b* represents the induction-pipe, through which the water flows in to the overflow-box *c*, through the orifices *o* within the immersed end of the pipe. Thus arranged the steam cannot enter the pipe *b* and obstruct the free passage of the water into the vessel A. *e*, an orifice through which the steam enters the vessel, and *d* an orifice through which the steam escapes. The dotted lines at these orifices represent the steam-pipes connected therewith.

The pipe *b* is attached to the vessel, and to this pipe is attached the overflow-box *c*, as represented.

Operation: The water, as it flows from the box *c*, is met by the exhaust-steam and dashed into a fine spray, in which condition the heat of the steam acts most readily upon these fine particles, thereby effecting a separation of the foreign elements by the consequent agitation and the action of the heat or caloric upon the water; and as the spray and steam condense, the water falls to a surface beneath, where the disintegrated elements are deposited.

When the water is thus prepared, it is so perfectly deprived of its foreign elements that incrustation of the steam-boiler does not take place.

Having thus fully described my invention, what I claim, and desire to secure by Letters Patent, is—

1. The overflow-box *c*, the pipe *b*, arranged with reference to the vessel A, substantially as described, and for the purposes specified.

2. The arrangement of the steam-pipe *e* to the overflow-box *c*, for the purposes set forth.

EDWIN R. STILWELL.

Witnesses:
THOS. D. MITCHELL,
JOSEPH H. STEELE.